(12) United States Patent
Wang et al.

(10) Patent No.: US 11,501,132 B2
(45) Date of Patent: Nov. 15, 2022

(54) PREDICTIVE MAINTENANCE SYSTEM FOR SPATIALLY CORRELATED INDUSTRIAL EQUIPMENT

(71) Applicant: Hitachi, Ltd., Tokyo (JP)

(72) Inventors: Qiyao Wang, Los Gatos, CA (US); Haiyan Wang, Fremont, CA (US); Chetan Gupta, San Mateo, CA (US); Hamed Khorasgani, San Jose, CA (US); Huijuan Shao, Cupertino, CA (US); Aniruddha Rajendra Rao, State College, PA (US)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 16/784,566

(22) Filed: Feb. 7, 2020

(65) Prior Publication Data

US 2021/0248444 A1   Aug. 12, 2021

(51) Int. Cl.
  G06N 3/04      (2006.01)
  G06Q 10/00     (2012.01)
  G06N 3/08      (2006.01)

(52) U.S. Cl.
  CPC .......... *G06N 3/04* (2013.01); *G06N 3/08* (2013.01); *G06Q 10/20* (2013.01)

(58) Field of Classification Search
  None
  See application file for complete search history.

(56) References Cited

U.S. PATENT DOCUMENTS 6,876,988 B2 *   4/2005   Helsper ................. H04L 41/22
                                                                706/26

OTHER PUBLICATIONS

Yang et al. ("Remaining Useful Life Prediction Based on a Double-Convolutional Neural Network Architecture," in IEEE Transactions on Industrial Electronics, vol. 66, No. 12, pp. 9521-9530, Dec. 2019) (Year: 2019).*

* cited by examiner

*Primary Examiner* — Roy Y Yi
(74) *Attorney, Agent, or Firm* — Procopio, Cory, Hargreaves & Savitch LLP

(57) ABSTRACT

In example implementations described herein, there are systems and methods for processing sensor data from an equipment over a period of time to generate sensor time series data; processing the sensor time series data in a kernel weight layer configured to generate weights to weigh the sensor time series data; providing the weighted sensor time series data to fully connected layers configured to conduct a correlation on the weighted sensor time series data with predictive maintenance labels to generate an intermediate predictive maintenance label; and providing the intermediate predictive maintenance label to an inversed kernel weight layer configured to inverse the weights generated by the kernel weight layer, to generate a predictive maintenance label for the equipment.

15 Claims, 10 Drawing Sheets

PREDICTIVE MAINTENANCE SYSTEM FOR SPATIALLY CORRELATED INDUSTRIAL EQUIPMENT

BACKGROUND

Field

The present disclosure is generally directed to predictive maintenance, and more specifically, to systems and methods for predictive maintenance for spatially correlated industrial equipment.

Related Art

Predictive Maintenance (PdM) techniques are designed to continuously monitor the equipment condition and recommend the right maintenance action at the right time, avoiding financial losses from both unnecessary over maintenance and unexpected failures. Predictive Maintenance has been formulated by researchers and practitioners from different perspectives, of which involve aspects such as 1) failure prediction, which aims to predict the probability that the equipment will fail within a pre-specified time horizon; and 2) remaining useful life estimation, which aims to estimate the remaining time to the end of useful life for the equipment. For simplicity, probability of failure and the remaining useful life value is referred to as the target predictive maintenance label.

With the advancement of the data collecting instruments and data storage resources, large amounts of continuously observed equipment sensor data have become increasingly accessible. Data-driven predictive maintenance approaches that leverage the power of machine learning and deep learning to predict the predictive maintenance label from the sensor time series data have been utilized in the related art. These data-driven approaches are often ensemble in physical analytical Internet-of-Things platforms to transmit predictive maintenance recommendations in real-time to maintenance crews and other stakeholders.

When developing data-driven predictive maintenance approaches, one prerequisite is that a set of homogeneous equipment is instrumented with a variety of sensors and that these sensors continuously generate regular measurements which are fully transmitted and stored for later retrieval and processing. Further, it is often assumed that the sensor data corresponding to different equipment units is independent, i.e., the value of the sensor from certain equipment is not affected by the other equipment. This is called the spatial independence assumption.

Further, it is assumed that the same correlation between sensor data and the predictive maintenance label is shared by all the equipment. This is the spatial stationarity assumption. However, such assumptions are often violated in practice. Examples involving the industrial setting can include the following.

Equipment in industrial networks (e.g., power grids and water supply networks) often interact with each other. For instance, a change in the voltage of one electric station in a power grid is not necessarily a sign of an incoming failure for this station. It can also be an indicator of high demand in neighboring stations. Due to the complex interactions among all the equipment, the probability of failure for the remaining useful life of any single equipment often cannot be accurately estimated from the local sensor data.

Industrial equipment (such as compressors, chillers) is often influenced by the external environment, including ambient temperature, air humidity, atmospheric pressure, and so on, while running. Consequently, the underlying relation between sensor data and the predictive maintenance label tends to be different among equipment installed at different geographical locations.

In the related art, there are various types of existing data-driven methods for handling spatial dependency and non-stationarity in Predictive Maintenance tasks.

Temporal deep learning networks (such as Recurrent Neural Network and Long Short-Term Memory) have been used in the related art to learn the mathematical mappings from sensor time series to predictive maintenance labels. The first type of related art approach combines these temporal deep networks with networks that appropriately handle spatial factors (e.g., Convolutional Neural Network) to solve the considered problem. However, such models typically have a large number of unknown parameters and require a large amount of sensor data and predictive maintenance labels per spatial location to train the model. This fact decreases the usefulness of these methods. On one hand, the models can only be reliably trained when a large amount of data has been collected. On the other hand, the training often needs to be pre-trained outside of the Internet of Things (IoT) systems due to the high requirements for calculation resources. The second drawback of such models is that they can only predict for equipment whose locations exist in the historical data, and they need the feed of sensor data at all spatial locations to predict all the predictive maintenance labels at once. The flexibility and scalability of the systems developed upon these methods are limited.

Functional data analysis has also been shown as powerful data-driven models to conduct the predictive maintenance analysis when data are independent, and the correlations are stationary. Compared to temporal deep networks, functional data models can be more efficient in terms of capturing the rich information in sensor data, i.e., they require fewer parameters and less training time.

The second type of related art approach incorporates spatial information via geographically weighted transformations into functional linear regression models. However, such related art models can only handle non-complex linear correlations between the sensor time series and the predictive maintenance labels. Industrial equipment is complex. Predictive maintenance systems based on such related art linear models tend to generate inaccurate maintenance recommendations. The bandwidth parameter that specifies the weighting strategy plays a key role in the accuracy of these models. However, the value of this important parameter is often suboptimal in these models, as ad-hoc ways have been used to select it. The spatial information, as a result, is not guaranteed to be appropriately incorporated in these models.

The third type of related art approach treats the additional spatial information as additional feature variables, which are supplied into regression models that output scalar labels, given any temporal data sequences (such as recurrent neural networks (RNN), Long Short-Term Memory (LSTM), functional linear regression). These models are capable of handling the non-stationarity among data to a certain degree. However, such models cannot effectively incorporate the dependency among data into the models.

SUMMARY

Example implementations described herein involve an innovative data-driven method that effectively learns the complicated correlation between the sensor data and the predictive maintenance label based on a set of equipment that exhibits spatial dependency and non-stationarity. Example implementations described herein can be incorporated into physical systems to create a predictive maintenance system that transmits predictive maintenance recommendations in real-time to maintenance crews and other stakeholders.

Example implementations involve a Weighted Functional Neural Network (WFNN) which serves as the core algorithm within a predictive maintenance system for spatially correlated equipment. In example implementations, a kernel weight is utilized, which is a non-decreasing function of an ensembled similarity metric across equipment. Compared to the weight function used in the related art, the kernel weight as described in example implementations has a more flexible format and incorporates more factors when modeling the characteristics of data introduced by spatial information.

To automatically choose the optimal value for the parameter of the kernel weight function, example implementations utilize a spatial-related functional neuron that transforms the raw sensor time series into kernel weighted sensor data, as well as a spatial-related regular neuron that transforms the raw predictive maintenance label to the inversed kernel weighted label. These two neurons are placed on the first and the last hidden layer in the proposed WFNN, which account for spatial dependency and non-stationarity. Different from existing approaches, the spatial related components are in the hidden layers of neural networks and can be systematically optimized along with the building of the model.

Example implementations thereby provide a sophisticated way to make predictions for new locations.

Compared to the related art implementations, the WFNN based predictive maintenance system can facilitate several advantages. For example, the example implementations of the system automatically tune the important parameters in weight kernel to improve the spatial information handling. The example implementations of the system further take into account data factors and domain expert opinions when quantifying the spatial correlation among equipment.

Example implementations can be further configured to model complex correlations between sensor data and PdM labels, while retaining flexibility in terms of sensor data formats. Example implementations can be applied to both sensor data with different measuring frequencies across sensors and equipment as well as sensor data with and without big time gaps.

Example implementations can further facilitate PdM estimations for new equipment with new spatial information. The proposed predictive maintenance system for spatially correlated equipment can be utilized in a wide range of industries in which equipment is physically connected and interacts with each other. The proposed system is also applicable to industrial equipment whose performance relies heavily on external factors, such as ambient temperature, air humidity, atmospheric pressure, and so on.

Aspects of the present disclosure include a method, which can involve processing sensor data from an equipment over a period of time to generate sensor time series data; processing the sensor time series data in a kernel weight layer configured to generate weights to weigh the sensor time series data; providing the weighted sensor time series data to fully connected layers configured to conduct a correlation on the weighted sensor time series data with predictive maintenance labels to generate an intermediate predictive maintenance label; and providing the intermediate predictive maintenance label to an inversed kernel weight layer configured to inverse the weights generated by the kernel weight layer, to generate a predictive maintenance label for the equipment.

Aspects of the present disclosure include a non-transitory computer readable medium, storing instructions for execution by a processor, which can involve processing sensor data from an equipment over a period of time to generate sensor time series data; processing the sensor time series data in a kernel weight layer configured to generate weights to weigh the sensor time series data; providing the weighted sensor time series data to fully connected layers configured to conduct a correlation on the weighted sensor time series data with predictive maintenance labels to generate an intermediate predictive maintenance label; and providing the intermediate predictive maintenance label to an inversed kernel weight layer configured to inverse the weights generated by the kernel weight layer, to generate a predictive maintenance label for the equipment.

Aspects of the present disclosure include a system, which can involve means for processing sensor data from an equipment over a period of time to generate sensor time series data; means for processing the sensor time series data in a kernel weight layer configured to generate weights to weigh the sensor time series data; means for providing the weighted sensor time series data to fully connected layers configured to conduct a correlation on the weighted sensor time series data with predictive maintenance labels to generate an intermediate predictive maintenance label; and means for providing the intermediate predictive maintenance label to an inversed kernel weight layer configured to inverse the weights generated by the kernel weight layer, to generate a predictive maintenance label for the equipment.

Aspects of the present disclosure include an apparatus, which can involve a processor, configured to process sensor data from an equipment over a period of time to generate sensor time series data; process the sensor time series data in a kernel weight layer configured to generate weights to weigh the sensor time series data; provide the weighted sensor time series data to fully connected layers configured to conduct a correlation on the weighted sensor time series data with predictive maintenance labels to generate an intermediate predictive maintenance label; and provide the intermediate predictive maintenance label to an inversed kernel weight layer configured to inverse the weights generated by the kernel weight layer, to generate a predictive maintenance label for the equipment.

DETAILED DESCRIPTION

Figure 1:
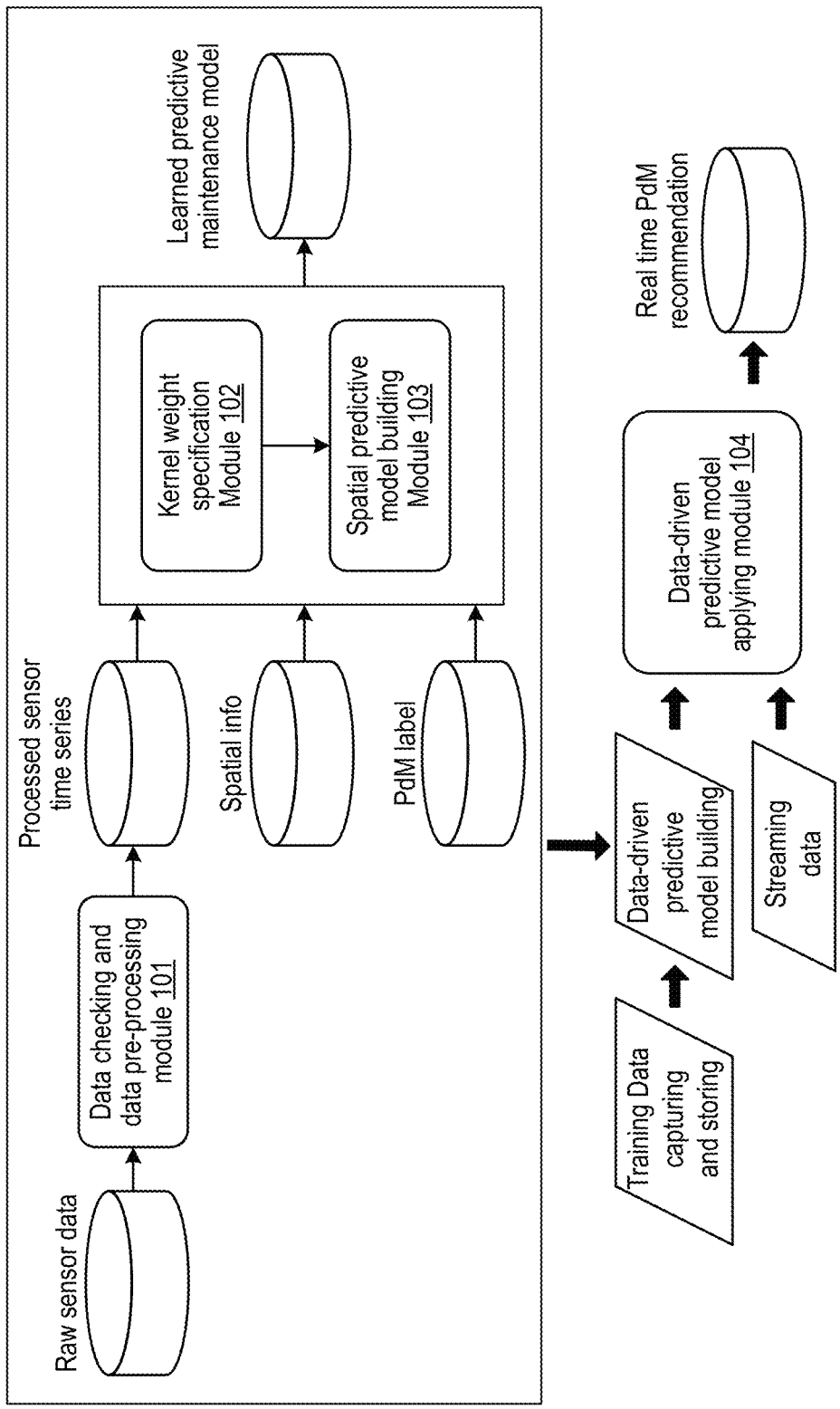
FIG. 1 illustrates a flow diagram upon which example implementations can be applied.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a data-driven model-based system to calculate and transmit predictive maintenance recommendations for scenarios where the equipment is spatially correlated. The proposed system can include components as follows, which can be implemented by any suitable hardware (e.g., storage systems, memories, processors) in accordance with the desired implementation.

Data collection and data storage units: This component collects historical sensor data, spatial metadata, and predictive maintenance label data. Also, such components also supply streaming sensor data and spatial data for real-time applications.

Data-driven predictive model building units: This component utilizes the proposed WFNN to build a predictive model using historical data.

Model deploying units: This component deploys the learned model on streaming data to produce and transmit real-time data-driven recommendations.

As is described herein, the proposed WFNN is applied for the Predictive Maintenance system for equipment that is spatially correlated. The proposed data-driven approach can involve the following modules, which can be facilitated by any hardware or combination of hardware (e.g., memory, processor, storage system) in accordance with the desired implementation.

Data checking and data pre-processing module: This module aims to ensure that the sensor data to be used in the later calculation is regularly observed over time, i.e., without big time gaps between adjacent observations. When the time gap between consecutive sensor measurements is relatively small and remains stable, the module keeps the raw sensor data for later calculation. If there exists a big time gap among data, the module conducts interpolation to fill in gaps within sensor data for each of the equipment.

Kernel weight function specification module: This module specifies the format of the kernel weight function based on an ensembled similarity metric.

Spatial predictive model learning module: This module conducts the learning phase of the proposed WFNN model for predicting target label from processed sensor data with the help of the kernel weight function defined in the kernel weight function specification module.

Spatial predictive model applying module: This module conducts the applying phase of the learned WFNN model from the spatial predictive model learning module.

Figure 2:
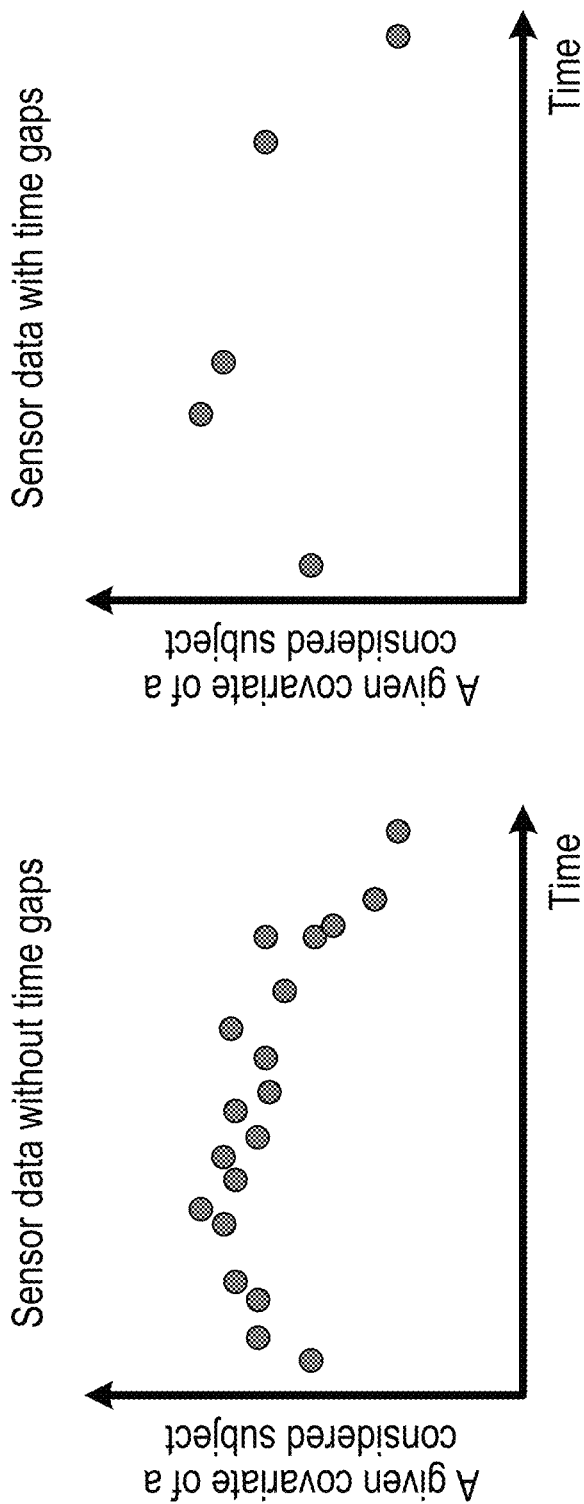
FIG. 2 illustrates examples of sensor data with and without big time gaps, in accordance with an example implementation.

FIG. 1 illustrates a flow diagram upon which example implementations can be applied. The data checking and data preprocessing module 101 involves a few steps. First, a data frequency checker examines whether there are any big time gaps in the sensor data. FIG. 2 illustrates examples of sensor data with and without big time gaps, in accordance with an example implementation. When big time gaps exist in sensor data, data imputation techniques fill in the gaps, converting sensor data on the right panel to the format in the left panel of FIG. 2. Further details of the data checking and data preprocessing module 101 are provided in FIG. 3.

Figure 3:
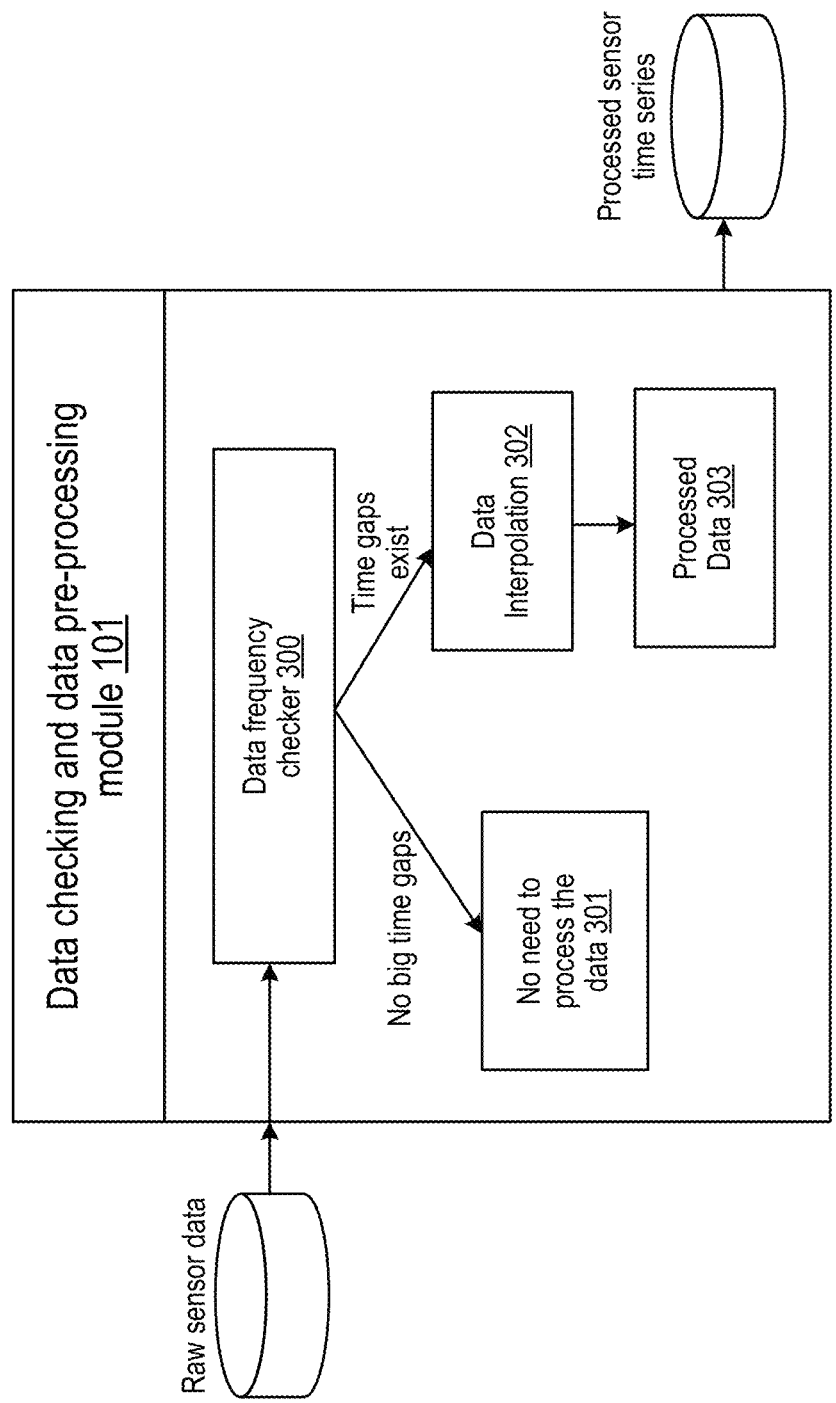
FIG. 3 illustrates a flow diagram for the data checking and data preprocessing module, in accordance with an example implementation.

FIG. 3 illustrates a flow diagram for the data checking and data preprocessing module, in accordance with an example implementation. As illustrated in FIG. 3, raw sensor data is provided to the data checking and preprocessing module 101 which is processed through a data frequency checker 300, which examines whether there are any big time gaps in the sensor data. The threshold for time gaps can be set in accordance with the desired implementation based on the underlying equipment, rate of data transmission, and so on. If there are no big time gaps, then the module 101 proceeds to 301 to provide the sensor time series data as there is no need to provide any additional processing in the data. If the time gaps do exist, then data interpolation is utilized to fill in the gaps as 302 to produce the processed data 303 which is output as the processed sensor time series data. Any desired implementation for data interpolation can be utilized based on the underlying equipment, historical data, and so on, and the present disclosure is not limited to any particular technique.

Figure 4:
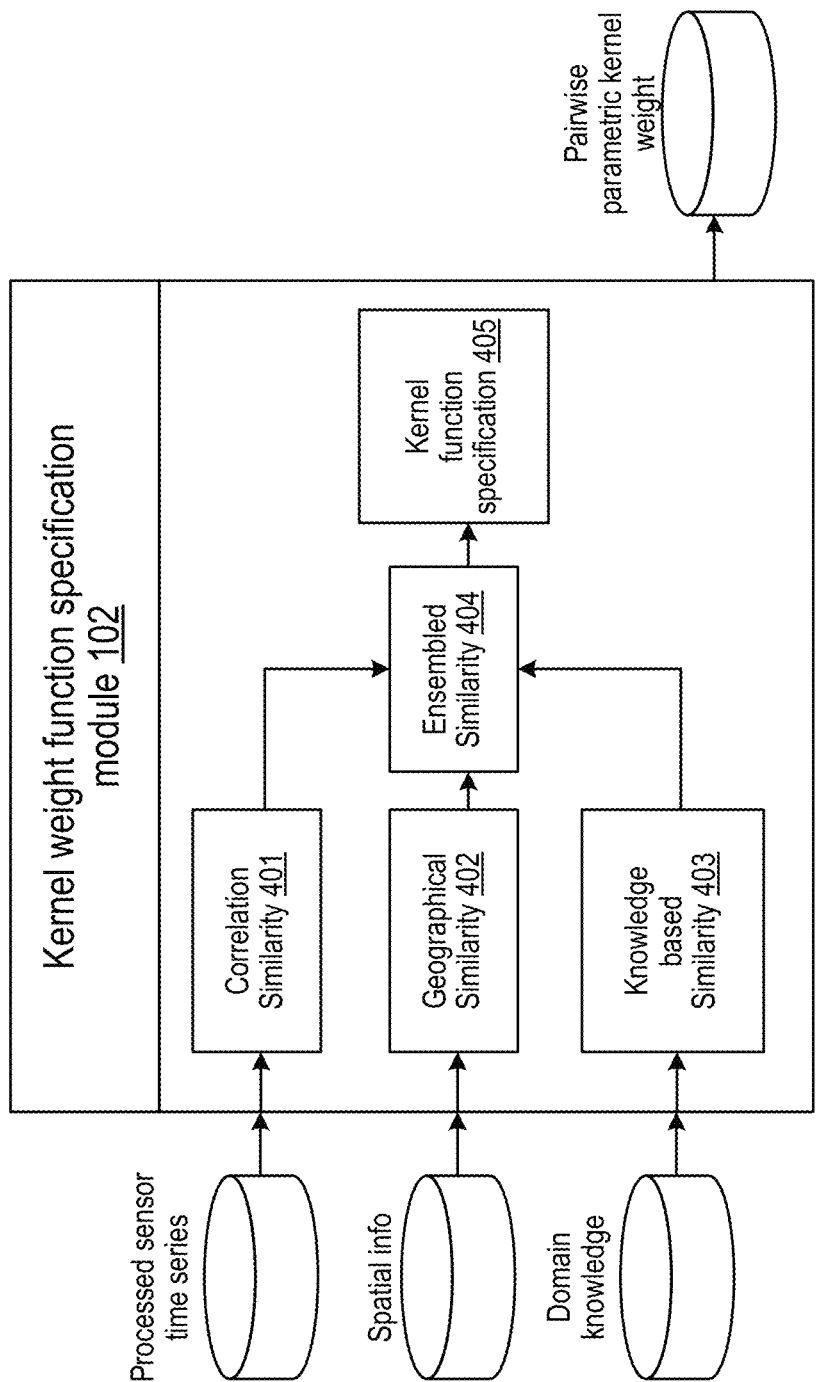
FIG. 4 illustrates an example flow diagram for the kernel weight function specification module, in accordance with an example implementation.

FIG. 4 illustrates an example flow diagram for the kernel weight function specification module, in accordance with an example implementation. The processed sensor time series data from the data checking and data pre-processing module 101 is provided to conduct correlation similarity 401. Spatial information regarding the location of the equipment associated with the sensor time series data is provided to conduct geographical similarity 402. Expert domain knowledge is provided to conduct knowledge-based similarity 403. From the similarities, the kernel weight function specification module 102 aims at quantifying the spatial dependency non-stationarity across equipment through the following.

(1) An ensembled similarity 404 that incorporates the information within sensor data, the spatial meta information about equipment, as well as domain knowledge is calculated. Suppose that the number of equipment is N and R sensors for each of them. For the i-th equipment, the sensor data of the r-th sensor are $(X_{r,i,1}(T_{r,i,1}), X_{r,i,2}(T_{r,i,2}), \ldots, X_{r,i,M_{r,i}}(T_{r,i,M_{r,i}}))$, the spatial location is a vector $L_i \in \mathbb{R}^d$.

Correlational similarity $S_{c,i,i'} \in \mathbb{R}^+$ between equipment i and i' is defined as the numerical estimate of the root of mean squared sensor difference over time, i.e., $$S_{c,i,i'} = \sqrt{\frac{1}{R}\sum_{r=1}^{R}\int(X_{r,i}(t)\overline{-X_{r,i'}(t)})^2 dt}$$

Geographical similarity $S_{g,i,i'} \in \mathbb{R}^+$ is the Euclidean distance between the two spatial locations, i.e., $$S_{g,i,i'} = \|L_i - L_{i'}\|$$

Knowledge-based similarity $S_{k,i,i'} \in \mathbb{R}^+$ is a similarity metric assigned by domain experts.

The ensembled similarity $S_{ensemble,i,i'} \in \mathbb{R}^+$ is a weighted sum of above metrics, $$S_{ensemble,i,i'} = w_1 S_{c,i,i} + w_2 S_{g,i,i} + w_3 S_{k,i,i'}$$

The weighting parameters $w=(w_1, w_2, w_3)$ affect the performance of the predictive models. Example implementations described herein automatically search for their optimal values that minimizes the training error, i.e., the difference between the ground truth predictive maintenance label and the estimated value.

(2) A parametric non-decreasing function of the ensembled similarity metric needs to be specified as a kernel function specification 405. In example implementations, the Gaussian kernel function is utilized, $$K(S_{ensemble,i,i'},h) = e^{-(0.5*(1/(hs_{ensemble,i,i'}))^2)}$$

where h is a bandwidth parameter that reflects the magnitude of the spatial factors $S_{ensemble,i,i'}$, S influence.

The optimal values of the weighting parameters and the bandwidth parameters will be learnt using the proposed neural network, and pairwise parametric kernel weights can thereby be obtained as output of the kernel weight function specification module.

Figure 5:
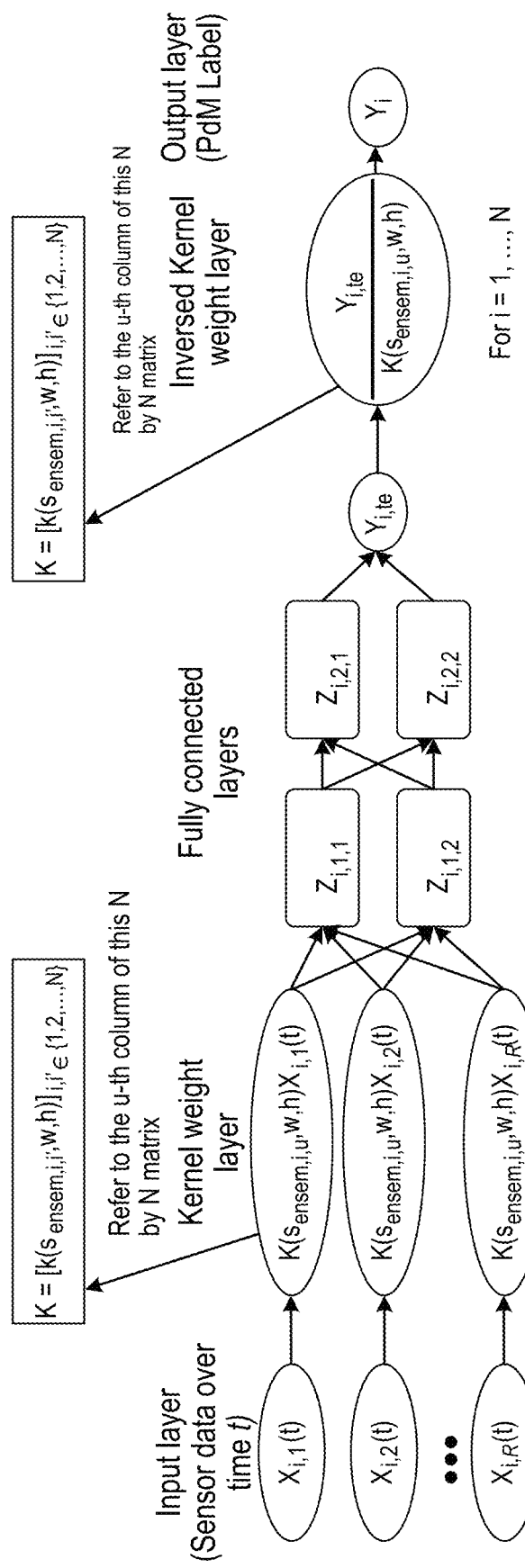
FIG. 5 illustrates the architecture of the WFNN, in accordance with an example implementation.

FIG. 5 illustrates the architecture of the WFNN, in accordance with an example implementation. For the spatial predictive model learning module 103, the architecture of the proposed WFNN is shown in FIG. 5. Related art approaches required the pre-determination of weight values, i.e., needs the specification of parameters in related weight functions. To select the parameter values, related art implementations try a series of candidate values and choose the one with the smallest training error. This practice often leads to suboptimal choices of parameter values and is time-consuming. In contrast to the related art implementations, the example implementations shown herein put the innovative spatial kernel weight layer and the inversed kernel weight layer within the hidden layers. In this way, the kernel weight-related parameters can be estimated more conveniently.

When using the WFNN to train the mapping for the u-th equipment using the historical data from all N equipment, the following components are utilized.

Input layers: All the sensor data of a given equipment i.

Kernel weight layer: Identify the kernel function value $K(S_{ensemble,i,u}, w, h)$ that quantifies the ensembled similarity between current equipment i with the target equipment u. Multiply the kernel weight function $K(S_{ensemble,i,u}, w, h)$ with the raw sensor data such that the data from different equipment contributes to the learning of the target equipment u proportionally to their spatial correlation metric.

Fully connected layers: These layers capture the complex correlation between the kernel weighted sensor data to the predictive maintenance label.

Inversed kernel weight layer: This layer transforms the numerical output to the same scale of the raw predictive maintenance label by dividing it with the kernel weight function $K(S_{ensemble,i,u}, w, h)$.

Output layer: This is the achieved predictive maintenance label.

For the u-th equipment, the WFNN can be trained from gradient descents using all N equipment as follows:

a) Forward propagation: For any given parameters, for each of the equipment in the training data, calculate the kernel weight layer, then supply these data to subsequent fully connected layers and the inversed kernel weight layer. Compare the final outputs of the deep network with the true failure prediction/Remaining Useful Life (RUL) labels for all equipment to see whether certain stopping criterion is met. If so, stop and output the current parameters and weight functions as the learned optimal solution. If not, go to the backward propagation step to search for better parameters.

b) Backward propagation: Calculate the partial derivatives of the loss function, which quantifies the sum of difference between the output of our deep network and the true label across all equipment, for the unknown parameters. Then use these partial derivations to update the parameter values used in the previous step. Then conduct forward propagation using the updated parameters.

Figure 6:
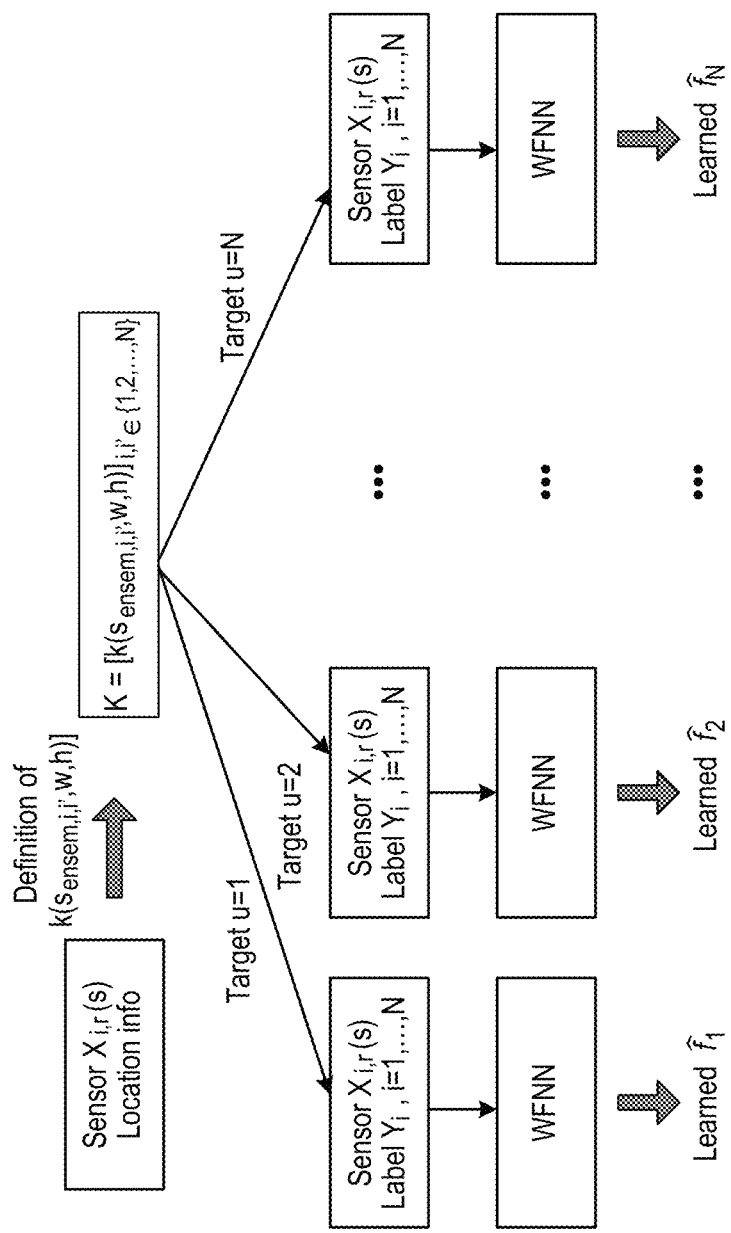
FIG. 6 illustrates the training phase, in accordance with an example implementation.

FIG. 6 illustrates the training phase, in accordance with an example implementation. The above procedures are repeated for all equipment in the system and proceed as illustrated in FIG. 6, and are executed by the spatial predictive model learning module 103.

There are two scenarios when applying the learned model in the spatial predictive model learning module 103 for streaming sensor data, to which the spatial predictive model applying module 104 applies different functions.

Figure 7:
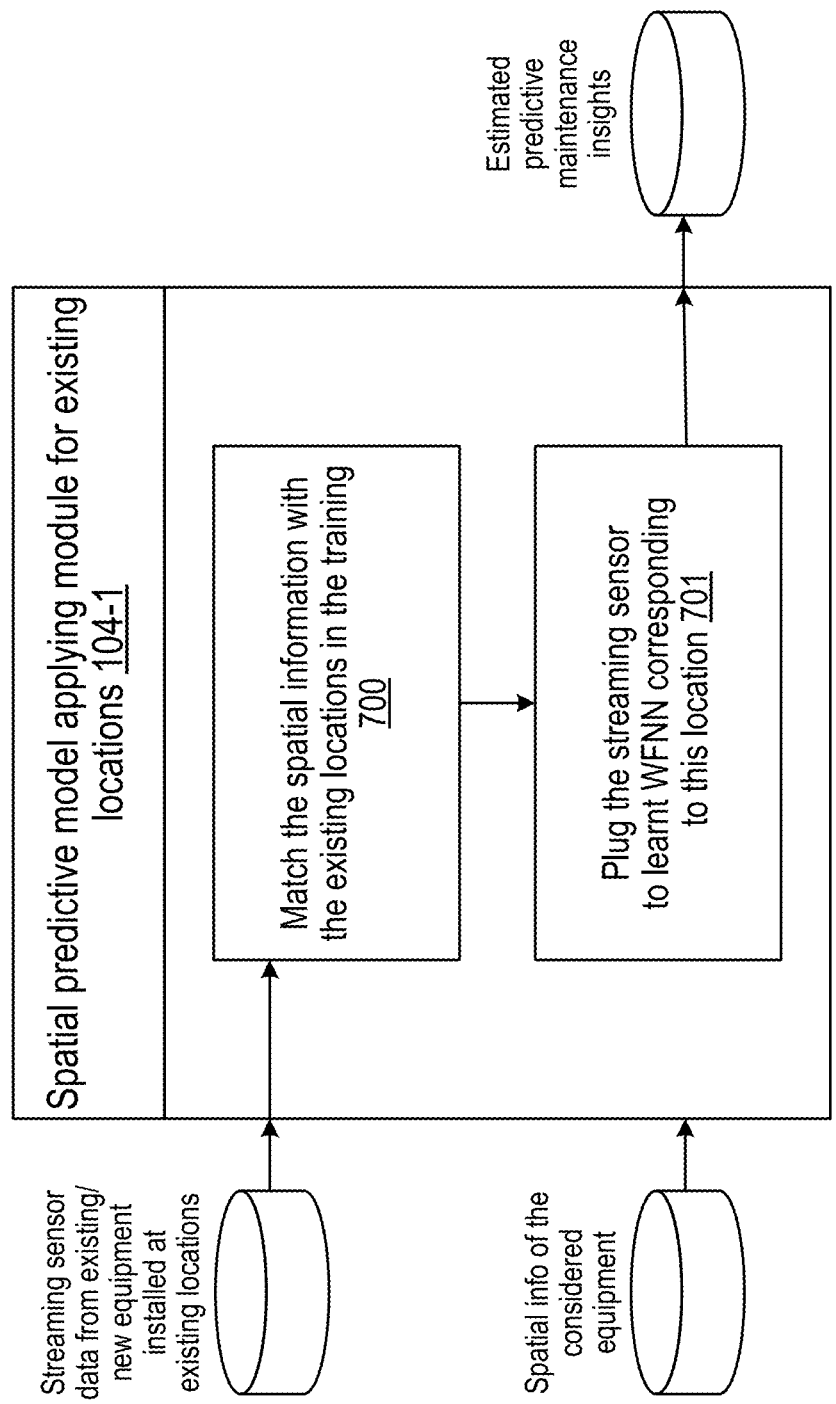
FIG. 7 illustrates an example scenario in which the streaming sensor data comes from equipment appearing in the training set, in accordance with an example implementation.

FIG. 7 illustrates an example scenario in which the streaming sensor data comes from equipment appearing in the training set, in accordance with an example implementation. Specifically, the spatial predictive model applying module 104 applies a first function 104-1, which involves, at 700, matching the spatial information with the existing locations at the training based on receiving streaming sensor data from existing or new equipment installed at known locations, along with spatial information of the information corresponding to the sensor data. The spatial predictive model applying module 104 thus finds the learned model corresponding to the spatial information of the considered equipment in the spatial predictive model learning module 103, including all unknown parameters in the hidden layers of the network, including the kernel weight layer, fully connected layers, and the inversed kernel weight layer. At 701, the spatial predictive model learning module 104 supplies the streaming sensor data to the WFNN with the found parameters and estimates the predictive maintenance label. The output is thereby the estimated predictive maintenance insights.

Figure 8:
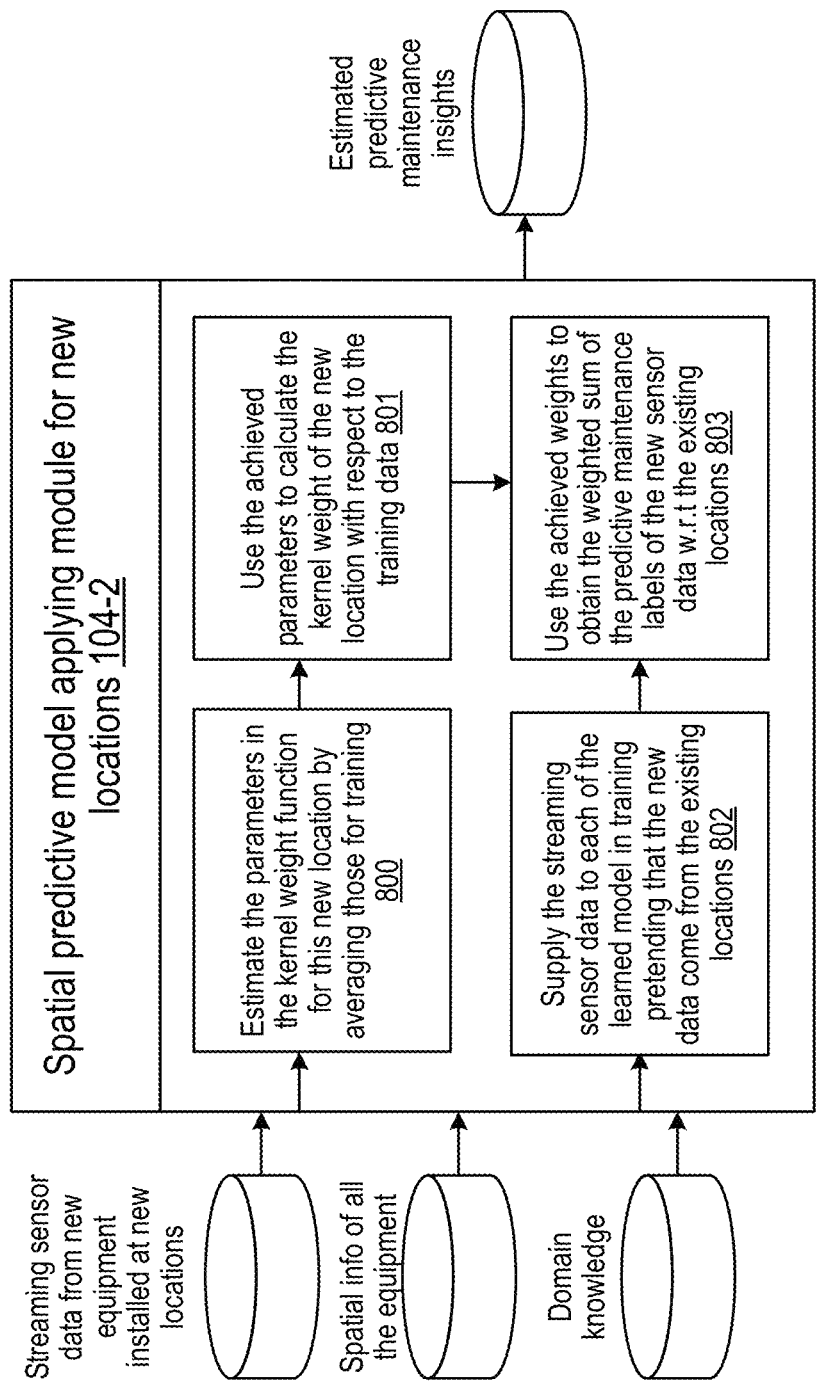
FIG. 8 illustrates an example scenario in which the streaming sensor data comes from equipment with new spatial information, in accordance with an example implementation.

FIG. 8 illustrates an example scenario in which the streaming sensor data comes from equipment with new spatial information, in accordance with an example implementation. Specifically, the spatial predictive model applying module 104 applies a second function 104-2 which intakes the streaming sensor data from new equipment installed at new locations, spatial information for all managed equipment, and domain knowledge.

At 800, the function 104-2 estimates the parameters in the kernel weight function for the new spatial location for the N equipment in training. The function 104-2 extracts the learned parameter w and h for the N equipment and uses the averages as the learned parameters for the new location.

At 801, the function 104-2 calculates the kernel weight function value based on the estimated parameters for the new spatial information.

At 802, the function 104-2 supplies the streaming sensor data to the N learned models in the training phase, and assumes that the sensor data comes from these locations. The function 104-2 gets N predictive maintenance label estimations for the streaming sensor data.

At 803, the function 104-2 uses the kernel weight value achieved at 800 to get a weighted sum for the N estimated predictive labels. This is the estimate for the PdM label estimation for the new equipment, which is output as the estimated predictive maintenance insights.

Figure 9:
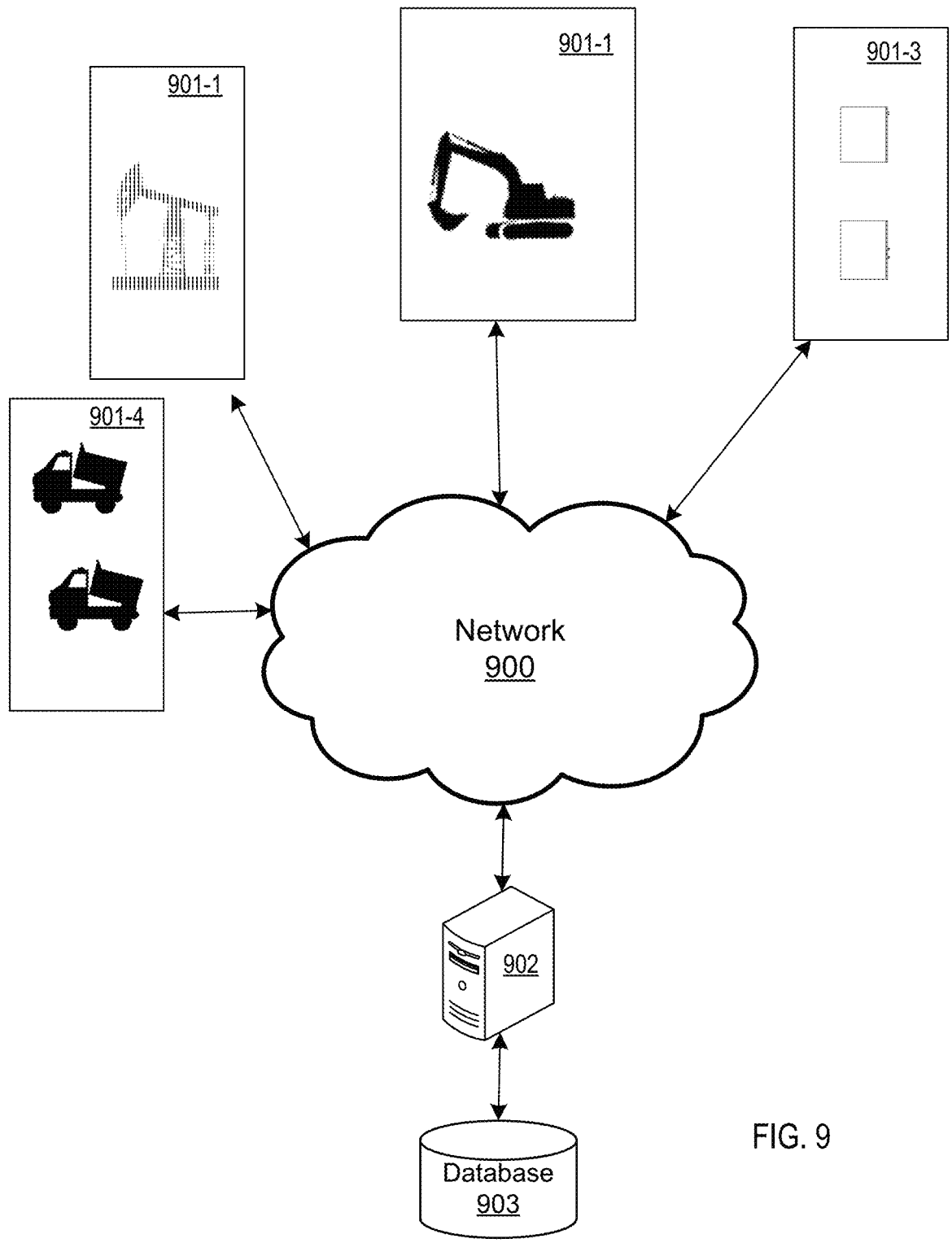
FIG. 9 illustrates a system involving a plurality of components and a management apparatus, in accordance with an example implementation.

FIG. 9 illustrates a system involving one or more equipment and a management apparatus configured to manage the one or more equipment, in accordance with an example implementation. One or more equipment or equipment systems 901-1, 901-2, 901-3, and 901-4 are communicatively coupled to a network 900 which is connected to a management apparatus 902. The management apparatus 902 manages a database 903, which contains historical data collected from the apparatuses and apparatus systems in the network 900. In alternate example implementations, the data from the apparatuses and apparatus systems 901-1, 901-2, 901-3, and 901-4 can be stored to a central repository or central database such as proprietary databases that data from equipment or equipment systems such as enterprise resource planning systems, and the management apparatus 902 can access or retrieve the data from the central repository or central database. Such equipment can include stationary equipment or equipment with sensor systems such as coolers, water tanks, air compressors, electrical lines, as well as mobile equipment or equipment such as moving robots, robotic arms, as well as any other equipment that are integrated into the industrial networks or can be part of an industrial network. The sensor data provided by the one or more equipment can involve raw sensor data from the equipment while under operation as well as when the equipment undergoes a fault. For integration into training a machine learning classifier and/or regressor for generating predictive maintenance models in accordance with the example implementations described herein, the sensor data may also be labeled to indicate if the sensor data incorporated from the equipment is when the equipment is operating in a normal condition or undergoing some sort of fault. Each of the equipment may be associated with a geographic location, wherein the management apparatus 902 maintains management information managing the one or more equipment under management by the management apparatus 902 and its associated geographical location.

Depending on the desired implementation, database 903 can also manage the spatial information, the predictive maintenance labels, the models utilized associated based on the spatial information, and the domain knowledge to facilitate the desired implementation. Spatial information can categorize associated equipment based on location (e.g., buildings, a zone of operation, global positioning satellite coordinates, etc.). Domain knowledge includes any domain knowledge that can be utilized for predictive maintenance, such as, but not limited to, types of defects that occur and their characteristic sensor data signatures, and so on. Predictive maintenance labels can be in the form of a binary such as normal/failure or normal/maintenance needed, and/or can be granulated to facilitate the desired implementation.

Figure 10:
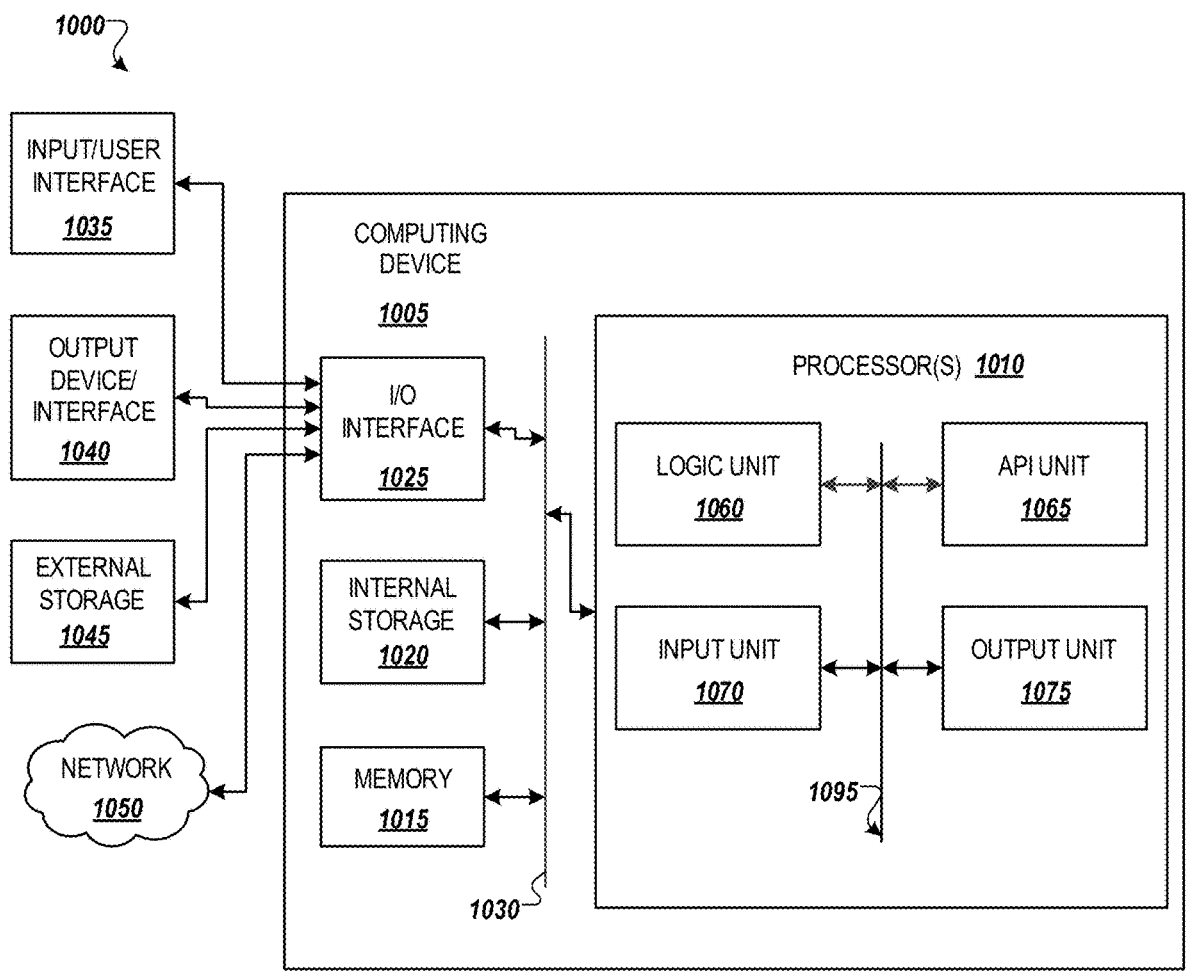
FIG. 10 illustrates an example computing environment with an example computer device suitable for use in some example implementations.

FIG. 10 illustrates an example computing environment with an example computer device suitable for use in some example implementations, such as a management apparatus 902 of FIG. 9. Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or IO interface 1025, any of which can be coupled on a communication mechanism or bus 1030 for communicating information or embedded in the computer device 1005. IO interface 1025 is also configured to receive images from cameras or provide images to projectors or displays, depending on the desired implementation.

Computer device 1005 can be communicatively coupled to input/user interface 1035 and output device/interface 1040. Either one or both of the input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via IO interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

IO interface 1025 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, the input unit 1070, the output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide an output based on the calculations described in example implementations.

Processor(s) 1010 can be configured to process sensor data from equipment over a period of time to generate sensor time series data as illustrated at 101 of FIG. 1; process the sensor time series data in a kernel weight layer configured to generate weights to weigh the sensor time series data as illustrated at FIG. 5; provide the weighted sensor time series data to fully connected layers configured to conduct a correlation on the weighted sensor time series data with predictive maintenance labels to generate an intermediate predictive maintenance label as illustrated at FIG. 5; and provide the intermediate predictive maintenance label to an inversed kernel weight layer configured to inverse the weights generated by the kernel weight layer, to generate a predictive maintenance label for the equipment as illustrated at FIG. 5.

Processor(s) 1010 can be configured to process the sensor data from the equipment over the period of time to generate the sensor time series data by, for a determination of time gaps existing in the sensor data, executing data interpolation to fill the time gaps to generate the sensor time series data as illustrated at FIG. 2 and 302, 303 of FIG. 3; and for a determination that the time gaps do not exist in the sensor data, providing the sensor data as the sensor time series data as illustrated at 301 of FIG. 3.

Processor(s) 1010 can be further configured to receive spatial information of the equipment; determine a location corresponding to the spatial information; and select the kernel weight layer, the fully connected layers, and the inversed kernel weight layer associated with the location as illustrated at 700 and 701 of FIG. 7.

Processor(s) 1010 are configured to receive spatial information of the equipment and domain knowledge for the equipment. For the spatial information indicative of a new location, processor(s) 1010 are configured to estimate parameters for the kernel weight layer based on averaging parameters utilized in a training set; calculate kernel weights from the estimated parameters for the new location; and utilize the calculated kernel weights to determine a weighted sum of the predictive maintenance label provided from the inverse kernel weight layer as illustrated in FIG. 8.

Processor(s) 1010 are configured to the apparatus of claim 13, the processor further configured to train the kernel weight layer, by determining correlational similarity on the sensor time series data; determining geographical similarity on spatial information of one or more managed equipment; determining knowledge-based similarity from domain knowledge of the one or more managed equipment; generating an ensembled similarity from the correlational similarity, the geographical similarity, and the knowledge-based similarity; and generate a kernel function specification from the ensemble similarity configured to generate the weights based on the ensemble similarity as illustrated in FIG. 4.

As described throughout the current disclosure, the weights can be generated based on a spatial correlation of the equipment to one or more managed equipment.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    processing sensor data from equipment over a period of time to generate sensor time series data;
    processing the sensor time series data in a kernel weight layer configured to generate weights to weigh the sensor time series data;
    providing the weighted sensor time series data to fully connected layers configured to conduct a correlation on the weighted sensor time series data with predictive maintenance labels to generate an intermediate predictive maintenance label; and
    providing the intermediate predictive maintenance label to an inversed kernel weight layer configured to inverse the weights generated by the kernel weight layer, to generate a predictive maintenance label for the equipment,
    wherein the processing the sensor data from the equipment over the period of time to generate the sensor time series data comprises:
    for a determination of time gaps existing in the sensor data, executing data interpolation to fill the time gaps to generate the sensor time series data; and
    for a determination that the time gaps do not exist in the sensor data, providing the sensor data as the sensor time series data.

2. The method of claim 1, further comprising:
    receiving spatial information of the equipment;
    determining a location corresponding to the spatial information; and
    selecting the kernel weight layer, the fully connected layers, and the inversed kernel weight layer associated with the location.

3. The method of claim 1, further comprising receiving spatial information of the equipment and domain knowledge for the equipment, wherein for the spatial information indicative of a new location:
    estimating parameters for the kernel weight layer based on averaging parameters utilized in a training set;
    calculating kernel weights from the estimated parameters for the new location; and
    utilizing the calculated kernel weights to determine a weighted sum of the predictive maintenance label provided from the inverse kernel weight layer.

4. The method of claim 1, further comprising training the kernel weight layer, the training the kernel weight layer comprising:
    determining correlational similarity on the sensor time series data;
    determining geographical similarity on spatial information of one or more managed equipment;
    determining knowledge-based similarity from domain knowledge of the one or more managed equipment;
    generating an ensembled similarity from the correlational similarity, the geographical similarity, and the knowledge-based similarity; and
    generate a kernel function specification from the ensemble similarity configured to generate the weights based on the ensemble similarity.

5. The method of claim 1, wherein the weights are generated based on a spatial correlation of the equipment to one or more managed equipment.

6. A non-transitory computer readable medium, storing instructions for executing a process, the instructions comprising:
    processing sensor data from equipment over a period of time to generate sensor time series data;
    processing the sensor time series data in a kernel weight layer configured to generate weights to weigh the sensor time series data;
    providing the weighted sensor time series data to fully connected layers configured to conduct a correlation on the weighted sensor time series data with predictive maintenance labels to generate an intermediate predictive maintenance label; and
    providing the intermediate predictive maintenance label to an inversed kernel weight layer configured to inverse the weights generated by the kernel weight layer, to generate a predictive maintenance label for the equipment,
    wherein the processing the sensor data from the equipment over the period of time to generate the sensor time series data comprises:
    for a determination of time gaps existing in the sensor data, executing data interpolation to fill the time gaps to generate the sensor time series data; and
    for a determination that the time gaps do not exist in the sensor data, providing the sensor data as the sensor time series data.

7. The non-transitory computer readable medium of claim 6, the instructions further comprising:
receiving spatial information of the equipment;
determining a location corresponding to the spatial information; and
selecting the kernel weight layer, the fully connected layers, and the inversed kernel weight layer associated with the location.

8. The non-transitory computer readable medium of claim 6, the instructions further comprising receiving spatial information of the equipment and domain knowledge for the equipment, wherein for the spatial information indicative of a new location:
estimating parameters for the kernel weight layer based on averaging parameters utilized in a training set;
calculating kernel weights from the estimated parameters for the new location; and
utilizing the calculated kernel weights to determine a weighted sum of the predictive maintenance label provided from the inverse kernel weight layer.

9. The non-transitory computer readable medium of claim 6, the instructions further comprising training the kernel weight layer, the training the kernel weight layer comprising:
determining correlational similarity on the sensor time series data;
determining geographical similarity on spatial information of one or more managed equipment;
determining knowledge-based similarity from domain knowledge of the one or more managed equipment;
generating an ensembled similarity from the correlational similarity, the geographical similarity, and the knowledge-based similarity; and
generate a kernel function specification from the ensemble similarity configured to generate the weights based on the ensemble similarity.

10. The non-transitory computer readable medium of claim 6, wherein the weights are generated based on a spatial correlation of the equipment to one or more managed equipment.

11. An apparatus, comprising:
a processor, configured to:
process sensor data from equipment over a period of time to generate sensor time series data;
process the sensor time series data in a kernel weight layer configured to generate weights to weigh the sensor time series data;
provide the weighted sensor time series data to fully connected layers configured to conduct a correlation on the weighted sensor time series data with predictive maintenance labels to generate an intermediate predictive maintenance label; and
provide the intermediate predictive maintenance label to an inversed kernel weight layer configured to inverse the weights generated by the kernel weight layer, to generate a predictive maintenance label for the equipment,
wherein the processor is configured to process the sensor data from the equipment over the period of time to generate the sensor time series data by:
for a determination of time gaps existing in the sensor data, executing data interpolation to fill the time gaps to generate the sensor time series data; and
for a determination that the time gaps do not exist in the sensor data, providing the sensor data as the sensor time series data.

12. The apparatus of claim 11, the processor further configured to:
receive spatial information of the equipment;
determine a location corresponding to the spatial information; and
select the kernel weight layer, the fully connected layers, and the inversed kernel weight layer associated with the location.

13. The apparatus of claim 11, the processor further configured to:
receive spatial information of the equipment and domain knowledge for the equipment, wherein for the spatial information indicative of a new location:
estimate parameters for the kernel weight layer based on averaging parameters utilized in a training set;
calculate kernel weights from the estimated parameters for the new location; and
utilize the calculated kernel weights to determine a weighted sum of the predictive maintenance label provided from the inverse kernel weight layer.

14. The apparatus of claim 11, the processor further configured to train the kernel weight layer, by:
determining correlational similarity on the sensor time series data;
determining geographical similarity on spatial information of one or more managed equipment;
determining knowledge-based similarity from domain knowledge of the one or more managed equipment;
generating an ensembled similarity from the correlational similarity, the geographical similarity, and the knowledge-based similarity; and
generate a kernel function specification from the ensemble similarity configured to generate the weights based on the ensemble similarity.

15. The apparatus of claim 11, wherein the weights are generated based on a spatial correlation of the equipment to one or more managed equipment.

* * * * *